(12) United States Patent
Yester et al.

(10) Patent No.: US 6,775,603 B2
(45) Date of Patent: Aug. 10, 2004

(54) METHOD AND SYSTEM FOR MAINTAINING PERSONALIZATION OF USER ADJUSTABLE FEATURES

(75) Inventors: John Loring Yester, Bloomfield Hills, MI (US); Krishnaswamy Venkatesh Prasad, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/682,785

(22) Filed: Oct. 18, 2001

(65) Prior Publication Data

US 2003/0078709 A1 Apr. 24, 2003

(51) Int. Cl.[7] .......................... G06K 5/00; G06F 17/00
(52) U.S. Cl. ........................................ 701/36; 235/375
(58) Field of Search ............................. 701/36–37, 45, 701/49; 340/825, 825.15, 825.28, 825.29, 5.1–5.2, 5.21, 5.3, 5.31–5.33, 5.42, 5.5, 5.51–5.55, 5.6–5.62, 5.7, 5.8, 5.71–5.74, 5.81–5.86; 307/10.1–10.6, 9.1; 318/466–469; 235/375, 382, 384

(56) References Cited

U.S. PATENT DOCUMENTS

| 4,578,592 A | | 3/1986 | Nakawawa et al. |
|---|---|---|---|
| 4,658,371 A | * | 4/1987 | Walsh et al. ................ 700/283 |
| 5,040,990 A | | 8/1991 | Suman et al. |
| 5,154,617 A | | 10/1992 | Suman et al. |
| 5,633,484 A | * | 5/1997 | Zancho et al. .............. 235/380 |
| 5,650,929 A | | 7/1997 | Potter et al. |
| 5,808,374 A | * | 9/1998 | Miller et al. ............. 200/61.54 |
| 6,107,696 A | | 8/2000 | Peter et al. |
| 6,198,996 B1 | * | 3/2001 | Berstis ........................ 701/36 |

OTHER PUBLICATIONS

Chene et al (U.S. 2002/0096572 A1).*

Liu et al (U.S. 2002/0081985 A1).*

* cited by examiner

*Primary Examiner*—Thu V. Nguyen

(57) ABSTRACT

A system and method are provided for selectively setting one or more variable vehicle operating parameters or features by storing information representative of user/driver preferences on a portable information storage device, and later recalled to automatically adjust the same or other system or device to the same setting(s). Examples of such systems or devices includes seat position, mirrors, radio presets, climate control settings, Web sites, bookmarks, and mobile telephone presets. The personalized "settings" are thus available to be transported and transferred where desired by the possessor of the device.

13 Claims, 2 Drawing Sheets

METHOD AND SYSTEM FOR MAINTAINING PERSONALIZATION OF USER ADJUSTABLE FEATURES

BACKGROUND OF INVENTION

The present invention generally relates to arrangements for setting user defined preferences to adjustable features in a vehicle system and, more particularly, to an improved interface arrangement and method that supports interfacing with the vehicle as well as systems external to the vehicle.

Generally, due to advances in control technologies, individuals have greater opportunity to set preferences and make adjustments to various elements and systems of their surroundings. In vehicles, homes and offices, these control arrangements allow individuals to independently adjust temperature, lighting, audio and information settings. This, coupled with the increased use of flexible home and work environments, has resulted in attempts to provide control arrangements that allow a user to automatically set or reinstate their preferences. For example, some vehicles include a control arrangement that allows users to adjust and recall personalized body, chassis and power train preferences. In other words, a desired suspension response, seat position, mirror adjustment and transmission shift pattern can be chosen by a driver and stored for future recall.

However, such known arrangements only store the settings of a small number of individuals. In addition, such control arrangements do not allow settings or preferences to be linked or transferred for use by other systems or elements. Rather, the settings are maintained and used only in one vehicle. As such, a need exists for a system and method capable of supporting greater flexibility and portability of user defined or adjustable system or device settings.

SUMMARY OF INVENTION

The present invention addresses this need by providing a method and system for setting and/or maintaining personalization of user adjustable features across multiple users, vehicles and settings by allowing individuals to record, recall, and set their preferences for a particular application or given environment. These preferences are electronically stored and re-instituted as information or data reflective of system or device preferences, and can be transferred for use by other vehicle and non-vehicle systems or devices.

In accordance with one aspect of the present invention, a system is provided for selectively setting a variable operating parameter in a vehicle that includes a portable information storage device having a storage element, means for receiving information representative of a particular operating parameter and storing the received information on the storage element, and means for generating an output signal based on the stored information. A vehicle interface is also included and is connected to an on-board vehicle control system having the variable operating parameter. The vehicle interface is arranged to receive the output signal generated by the portable storage device for input to the on-board control system, and the on-board control system is arranged to set the variable operating value based on the information in the input signal.

In accordance with another aspect of the present invention, a system is provided for selectively setting a variable user preference in a vehicle which includes a portable information storage device arranged to receive and store information representative of at least one user preference, and a vehicle interface connected to an on-board vehicle system capable of being set in accordance with a user preference, wherein the vehicle interface is arranged to receive user preference information from the portable storage device for input to the on-board vehicle system, and the on-board operating system is arranged to set the system based on the received user preference information.

In accordance with still another aspect of the present invention, a method is provided for selectively setting a variable user preference in a vehicle which includes determining at least one user preference, storing information representative of the at least one user preference on a portable information storage device, selectively recalling the user preference information stored on the portable information storage device, and setting an on-board vehicle system in accordance with the recalled user preference.

In accordance with yet another aspect of the present invention, a portable information storage device is provided for use with a system arranged to selectively set a variable operating parameter in a vehicle, wherein the portable information storage device includes a data storage element, means for receiving information representative of a particular operating parameter and storing the received information on the storage element, and means for generating an output signal based on the stored information. The portable information storage device is arranged to interface with an on-board vehicle control system having the variable operating parameter, and the on-board control system is arranged to set the variable operating value based on the information in the generated output signal.

Thus, by maintaining personalized settings on a portable personal data storage device, the present invention supports personalization by a number of different users across multiple vehicles. More specifically, the personal data storage device allows personalized settings from any particular user to be transferred to other vehicles, environments or situations. For example, the portable personal storage device of the present invention can be used to automatically tune an in-home audio entertainment system to the same radio station(s), CD track, etc., set in the vehicle. This allows an individual to transition across a variety of locations, settings and situations, and adapt the changing location, physical setting, or situation to the personal preferences of the individual.

In accordance with yet another aspect of the present invention, vehicle performance or other operational information tracked by the vehicle can be downloaded to the portable personal data storage device for transfer to another system for analysis or record keeping. Thus, a vehicle device or system can be interrogated, and the resulting information made available to the personal storage device or mechanism. This benefit is particularly advantageous to fleet vehicle users and owners. With the present invention, additional information can be included to assist with vehicle maintenance and repair tracking and scheduling, vehicle prognostics/diagnostics, fuel economy, as well as tracking work/personal related vehicle usage.

The above-described aspects, as well as other aspects, features and advantages of the present invention will be readily apparent from the following detailed description of the detailed description of the preferred embodiment(s) when taken in connection with the accompanying drawings.

DETAILED DESCRIPTION

Figure 1:
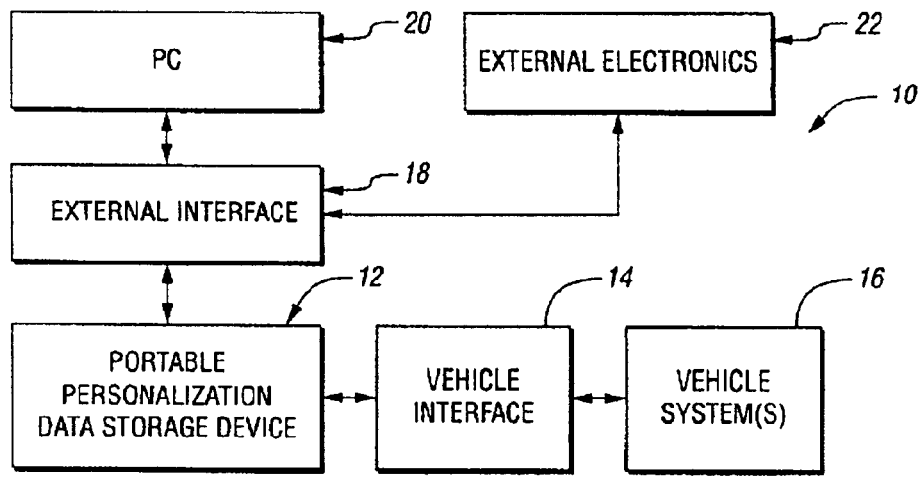
FIG. 1 is a block circuit diagram showing a system for maintaining and setting user preferences for a variable operating parameter.

Referring to FIG. 1, the present invention provides a system 10 for maintaining and setting one or more user-defined preferences to at least one operating system. More particularly, a portable personalization storage device 12 is used to download new and/or updated preference information used by a particular operating system to set one or more variable operating parameters. Once stored on portable storage device 12, the information can be easily transferred as an output signal to the originating control system, or other operating systems to reset the variable operating parameter to the desired user preference.

As shown, portable storage device 12 communicates with a vehicle mounted interface circuit 14 to send and receive the desired user preference information. Interface 14 is connected to at least one vehicle control system 16 having a variable parameter. In one embodiment, vehicle control system 16 can be arranged in accordance with known designs to monitor and store data representing vehicle operating data, such as vehicle mileage and/or engine/vehicle malfunctions. Such operating data can be selectively or automatically sent to the portable storage device for storage therein.

In addition, portable storage device 12 can interface with one or more external interfaces 18 to facilitate bi-directional communication of data between the storage device and a personal computer system (PC) 20, or other external electronic devices/systems 22 such as audio/entertainment systems, mobile telephones, digital audio devices, digital cameras, or other similar devices.

The communication link between the portable storage device 12 and an interface can be wireless, such as via radio, magnetic, optical or acoustic communication circuitry, or wired such as via a suitable set connecting socket. Implementation of such communication circuitry is well understood by one of ordinary skill in the art. In addition, the data can be encrypted/decrypted in accordance with known encryption arrangements to provide a more secure transfer of data. Still further, a suitable authenticating arrangement, such as a thumb print analyzer, can be incorporated into storage device 12, or connected to interface 14 or 18, to allow an operating system to authenticate and verify the identity of the user before implementing the desired preferences or downloading any data.

Vehicle interface 14 can be mounted to a vehicle door, instrument panel, an interior console and/or other location that is conveniently accessed by a user. Interface 18 can be located in a home, office or repair shop as desired. The interfaces communicate with the respective operating systems via a wired or wireless connection.

Figure 2:
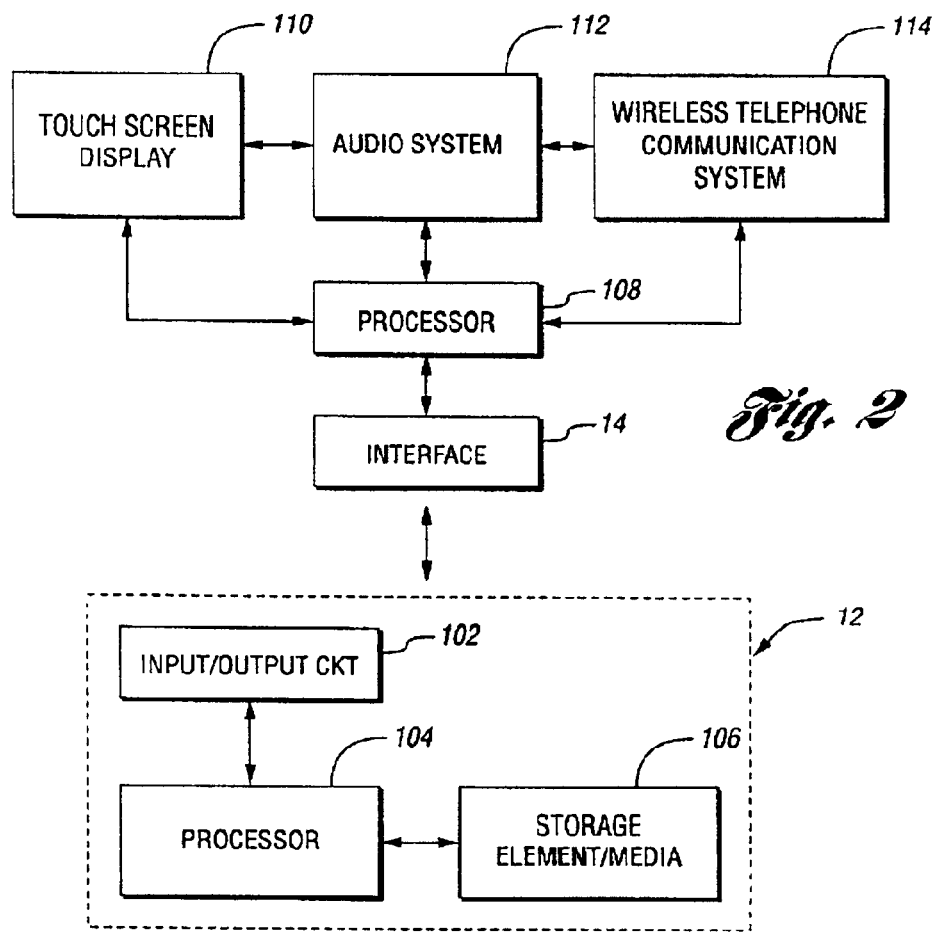
FIG. 2 is a block diagram of an exemplary embodiment of a system in accordance with the present invention.

Referring now to FIG. 2, a block diagram is shown for an exemplary embodiment of a system in accordance with the present invention. More specifically, storage device 12 includes a suitable input/output circuit 102 connected to a processor 104, such as a microprocessor-based circuit. Processor 104 is connected to a storage element/media 106. Alternatively, the circuit can be implemented as a dedicated IC capable reading data bits in and out of a register. Storage device 12 can be integrated into a key fob, or provided as a separate portable device. Storage device 12 can operate as a beacon transmitter, or include a switch to allow a user to selectively enable the device to transmit or receive data. The portable storage device can include its own power source, or alternatively, be arranged to generate operating power from an interrogation signal transmitted by an interface. Implementation of either arrangement is well understood by one of ordinary skill in the art.

Storage device 12 can also be programmed to dynamically and independently analyze the type of information received, as well as determine a corresponding response. Thus, the storage device 12 can be used for such functions as security, authentication, environment setting/determination, scheduling, automated updating, data logging or data exchanges.

The vehicle mounted system can include a processor 108, such as microprocessor-based circuit, connected to a touch screen display 110, and audio system 112, and a wireless communication system 114 such as a mobile telephone unit. Processor 108 includes a control arrangement that allows a user to adjust, or customize, one or more operating parameters. Examples of in-vehicle parameter personalization include the following: radio presets; climate settings; seat position; mirror settings; suspension settings; power train settings (including valet settings); cellular telephone presets; MP3 play lists; service/maintenance history and/or schedule; preferred service providers for off-board services; authentication information for e-commerce; security features and vehicle access control; portable digital assistant (PDA) access, reminders and updates; wireless access settings such as cellular phone, ISPs, and links to home/office networks; off-board service providers using dining/entertainment/vehicle information to offer goods and services in a timely fashion; dealership service appointment scheduling based on a user's preferred day/location; and dealership service selected to receive transmission of vehicle status information for diagnosis and parts ordering in preparation of vehicle arrival. Examples of home parameter personalization include audio and video entertainment preferences; temperature/humidity; security; shopping lists; Internet and e-commerce; lighting control; calendar/reminder entries; and address/telephone book entries. Examples of work parameter personalization include scheduling and appointments, and contact information.

Upon receipt and verification/validation (if required) of the user preference data from the portable storage device 12, processor 108 will generate the appropriate control signal(s) to implement the desired preference or setting, or update a system database as required. The processor or interface can be arranged to automatically download any new or modified preference information to the portable storage device 12 upon implementation, at system power down, and/or upon input of a specific user command.

Figure 3:
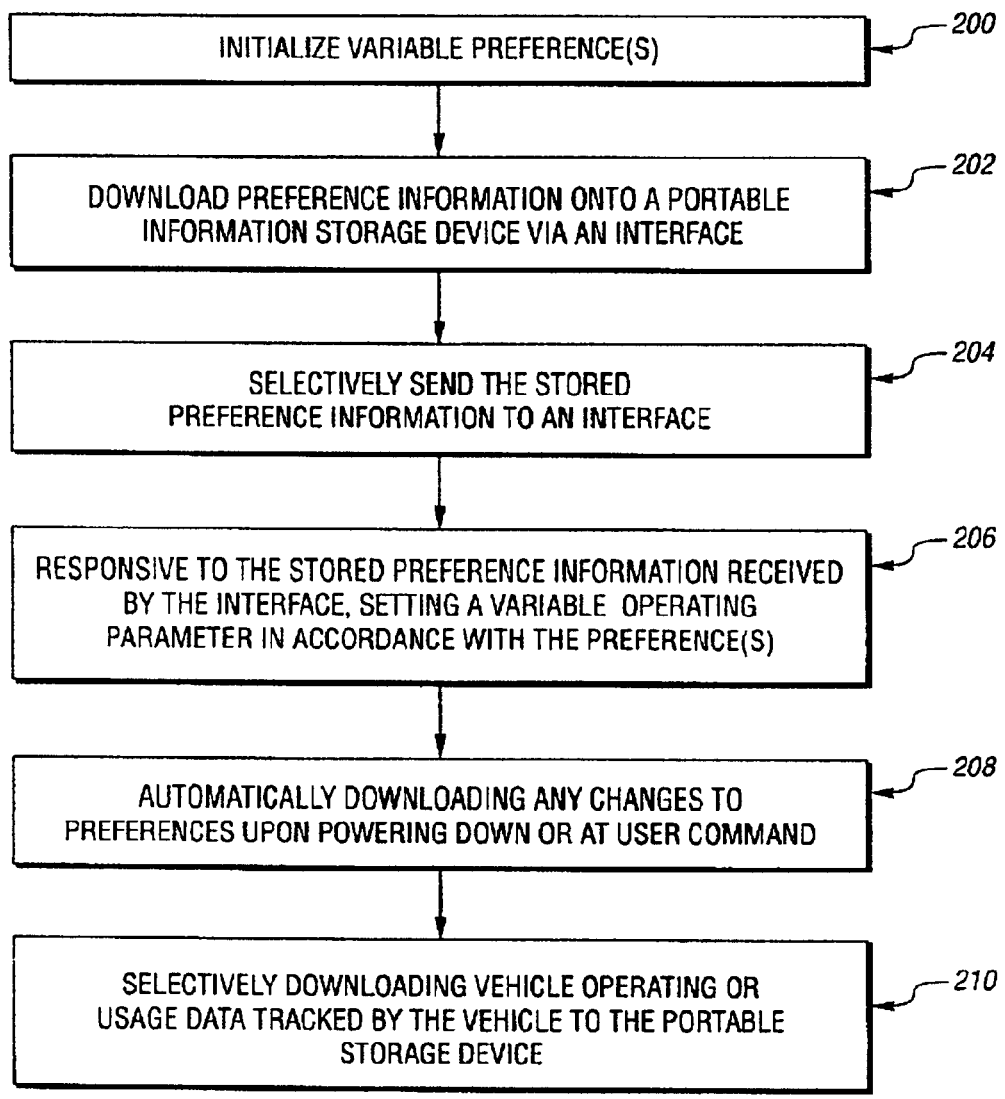
FIG. 3 is a flowchart showing the process of maintaining and setting user preferences in accordance with the present invention.

FIG. 3 provides a flowchart showing the overall method of the present invention. As denoted at block 200, one or more variable operating parameters are initialized as user desired preferences. Such initialization can include setting and storing of a particular seat or mirror position, or storing of a particular audio file play list. Once the preference is established, information representative of the preference(s) is downloaded at block 202 to the portable storage device 12 via a suitable interface. At block 204, the information stored on the portable storage device can be selectively transferred to a desired interface, which subsequently communicates the preference information to the appropriate control/operating system.

As denoted at block 206, a variable operating parameter is set in accordance with the transferred information. At block 208, any new preference information can be automatically downloaded to the portable storage device 12 at the time of implementation, system power down, and/or user command. Finally, as denoted by dashed block 210, other data such as vehicle mileage or other operating/performance information can be downloaded to the portable storage device as desired.

Thus, the present invention provides a vehicle owner/assessor with an ability to unobtrusively enable desired environmental settings for comfort, convenience, safety, and security. The user can maintain a consistent level of environmental settings, while other information that may be setting specific, can be captured and later recalled, or applied, when the user is in an appropriate setting. For example, if a work-related web site was located and accessed from an in-home system, the corresponding address information could be stored and later recalled when desired from a different site, such as while at an office system.

Therefore, the method and system of the present invention allows systems to be taught and adjusted accordingly to a user's preferences and activities, even if those preferences and activities change over time. The personalization storage device could store information related to the individual in addition to various preferences regarding home, work, and recreation, along with information that defines how the individual accesses the devices and services available. For example, an individual can leave home and in the process of departing, the portable storage device can be manually or transparently loaded with information pertinent to the individual regarding recent home activities that relate to areas of the individual's lifestyle. This could be in the form of music genre and sources that the individual has indicated a preference though recent listening or longer term trend monitoring. Information about recent Internet activity, related to the work place, could be captured and stored in the form of bookmarks. This type of preference and pattern monitoring can be extended to include shopping lists, temperature settings, new sources of entertainment, along with information on the individual's financial institutions, preferred access providers for Internet, e-commerce, service providers. The aspect of personal safety could extend this to include any special medical conditions or histories.

Once this information is stored, operating parameters within the vehicle can be changed to use this information so as to provide an extended environment. As within the home environment, the vehicle offers similar opportunities for a personalization storage device to acquire and use preference and pattern information related to vehicle usage. This takes the form of seat position, climate settings, radio and other audio entertainment settings, mirror adjustments, suspension settings, and other driver adjustable settings the vehicle offers. The immediate advantage of using such a personalization storage device is that regardless of who last used the vehicle, the individual's preferences regarding vehicle features and adjustments can be accommodated and easily recalled.

In addition, the personalization storage device can serve as a resource for defining interaction between the vehicle and various mobile devices. A vehicle could provide an environment where scheduled appointments stored on a portable digital assistant (PDA) could be monitored. Visual or audible reminders to the driver could be automatically provided by the vehicle. The vehicle system could display or announce details of the appointment and use tactile or audible responses from the driver regarding the disposition of the appointment. This interaction can be extended, where the vehicle system operates to combine PDA and mobile phone operation so as to initiate a telephone call using appointment or contact information that is stored on the PDA. Additionally, a mobile phone or similar wireless link, a PDA, and the vehicle could be combined using stored preferences so that information from an off-board service provider can be delivered in a timely fashion. This can include information such as the driver's interest in restaurants serving a preferred cuisine. Thus the personalization storage device can operate as a collection point for evolving patterns and interest of individuals. As vehicles develop connections to off-board service providers for roadside assistance, driving directions, and concierge services, the personalization storage device in accordance with the present invention can be used to provide filters whereby off-board content can be provided in a manner acceptable to the individual. The ability of the vehicle to access and update information stored on PDAs, mobile phones and other types of personal electronic devices enables the vehicle to be a conduit between the off-board service providers and these devices.

While embodiments of the invention have been illustrated and described, it is not intended that these embodiments illustrate and describe all possible forms of the invention. Rather, the words used in the specification are words of description rather than limitation, and it is understood that various changes may be made without from the spirit and scope of the invention.

What is claimed is:

1. A system for selectively setting a variable operating parameter of a vehicle device and a corresponding non-vehicle device for an operator of the vehicle device and the non-vehicle device, the system comprising:

a portable information storage device having a storage element, means for receiving from a human operator information representative of the operator's preference for a particular operating parameter for the vehicle device and storing the received information on the storage element, and means for generating an output signal based on the stored information;

a vehicle interface connected to an on-board vehicle control system having the variable operating parameter, the vehicle interface arranged to receive the output signal generated by the portable storage device for input to the on-board vehicle control system, wherein the on-board vehicle control system is arranged to set a value of the variable operating parameter for the vehicle device based on the information in the input signal;

wherein the portable information storage device further includes means for receiving, from the vehicle interface, information representative of usage of the vehicle device by the operator, and means for storing the information representative of the usage of the vehicle device by the operator; and a non-vehicle interface connected to an off-board non-vehicle control system, and arranged to receive the output signal generated by the portable storage device for input to the off-board non-vehicle control system, and further arranged to access the stored information representative of the usage of the vehicle device by the operator, wherein the off-board non-vehicle control system is arranged to set a value of the variable operating parameter for the non-vehicle device corresponding to the vehicle device based on the information in the input signal and the information representative of usage of the vehicle device by the operator.

2. The system of claim 1 wherein the means for receiving information and the means for generating an output signal are wireless communication devices.

3. The system of claim 1 wherein the operating parameter comprises a user preference for at least one of the following: radio preset; climate setting; seat position; mirror position; suspension setting; power train setting; cellular telephone preset; digital audio file play list; service history or schedule; preferred service provider for an a non-vehicle provided service; authentication information for e-commerce; vehicle access control; calendar reminder; wireless access setting such as Internet Service Provider (ISP); and vehicle service appointment scheduling based on a user's preferred day or location.

4. A system for selectively setting a variable user preference in a vehicle system and a corresponding non-vehicle system comprising:

a portable information storage device arranged to receive from a human user and store information representative of at least one user preference for the vehicle system, and further arranged to receive and store information representative of usage of the vehicle system by the user;

a vehicle interface connected to an on-board vehicle control system capable of being set in accordance with a user preference, wherein the vehicle interface is arranged to receive user preference information for the vehicle system from the portable storage device for input to the on-board vehicle control system, and the on-board vehicle control system is arranged to set the vehicle system based on the received user preference information for the vehicle system; and a non-vehicle interface connected to an off-board non-vehicle control system, and arranged to receive the user preference information for the vehicle system and the vehicle system usage information from the portable information storage device for input to the off-board non-vehicle control system, wherein the off-board non-vehicle control system is arranged to set the non-vehicle system corresponding to the vehicle system based on the received user preference information for the vehicle system and the received vehicle system usage information.

5. The system of claim 4 wherein the portable information storage device and the vehicle interface are arranged to communicate wirelessly.

6. The system of claim 4 herein the user preference comprises at least one of the following: radio preset; climate setting; seat position; mirror position; suspension setting; power train setting; cellular telephone preset; digital audio file play list; service history or schedule; preferred service provider for an a non-vehicle provided service; authentication information for e-commerce; vehicle access control; calendar reminder; wireless access setting such as Internet Service Provider (ISP); and vehicle service appointment scheduling based on a user's preferred day or location.

7. A method of selectively setting a variable user preference in a vehicle system and a corresponding non-vehicle system comprising:

receiving at least one user preference for the vehicle system from a human user; determining usage of the vehicle system by the user;

storing information representative of the at least one user preference for the vehicle system and the user's usage of the vehicle system on a portable information storage device;

selectively recalling the user preference for the vehicle system information and the user's usage of the vehicle system information stored on the portable information storage device;

setting the vehicle system in accordance with the recalled user preference information for the vehicle system; and setting the non-vehicle system corresponding to the vehicle system in accordance with the recalled user preference for the vehicle system information and the recalled user's usage of the vehicle system information.

8. The method of claim 7 further comprising storing information of changes to the user preference on the portable information storage device upon user command.

9. The method of claim 7 further comprising automatically storing information representative of changes to the user preference on the portable information storage device.

10. The method of claim 7 wherein the user preference comprises at least one of the following: radio preset; climate setting; seat position; mirror position; suspension setting; power train setting; cellular telephone preset; digital audio file play list; maintenance history or schedule; preferred service provider for an a non-vehicle provided service; authentication information for e-commerce; vehicle access control; calendar reminder; wireless access setting such as Internet Service Provider (ISP); and vehicle service appointment scheduling based on a user's preferred day or location.

11. A portable information storage device for use with a on-board vehicle control system arranged to selectively set a variable operating parameter in a vehicle system for an operator of the vehicle, and for use with an off-board non-vehicle control system arranged to selectively set a variable operating parameter in a non-vehicle system corresponding to the vehicle system, said portable information storage device comprising:

a storage element;

means for receiving, from a human operator, information representative of the operator's preference for a particular operating parameter for the vehicle system and storing the received information representative of the particular operating parameter for the vehicle system on the storage element;

means for receiving information representative of usage of the vehicle system by the operator and storing the received information representative of the usage of the vehicle system by the operator on the storage element; and means for generating an output signal based on the stored information, wherein the portable information storage device is arranged to interface with an on-board vehicle control system having the variable operating parameter, the on-board control system arranged to set the variable operating value of the vehicle system based on the information in the generated output signal;

wherein the portable information storage device is arranged to interface with an off-board non-vehicle control system, the off-board non-vehicle control system is arranged to set a variable operating value of the non-vehicle system corresponding to the vehicle system based on the information in the generated output signal.

12. The storage device of claim 11 wherein the means for receiving information and the means for generating an output signal are wireless communication devices.

13. The storage device of claim 11 wherein the operating parameter comprises a user preference for at least one of the following: radio preset; climate setting; seat position; mirror position; suspension setting; power train setting; cellular telephone preset; digital audio file play list; service history or schedule; preferred service provider for an a non-vehicle provided service; authentication information for e-commerce; vehicle access control; calendar reminder; wireless access setting such as Internet Service Provider (ISP); and vehicle service appointment scheduling based on a user's preferred day or location.

* * * * *